(12) United States Patent
Seo et al.

(10) Patent No.: US 9,166,719 B2
(45) Date of Patent: Oct. 20, 2015

(54) METHOD OF TRANSMITTING AND RECEIVING SIGNALS IN A MOBILE COMMUNICATION SYSTEM USING A RADIO FRAME INCLUDING MULTIPLE TYPES OF SUBFRAMES AND APPARATUS THEREOF

(75) Inventors: In Kwon Seo, Anyang-si (KR); Dae Won Lee, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 301 days.

(21) Appl. No.: 13/695,003

(22) PCT Filed: Apr. 25, 2011

(86) PCT No.: PCT/KR2011/002984
§ 371 (c)(1),
(2), (4) Date: Oct. 26, 2012

(87) PCT Pub. No.: WO2011/136519
PCT Pub. Date: Nov. 3, 2011

(65) Prior Publication Data
US 2013/0051351 A1  Feb. 28, 2013

Related U.S. Application Data

(60) Provisional application No. 61/329,061, filed on Apr. 28, 2010.

(51) Int. Cl.
*H04J 11/00* (2006.01)
*H04L 5/00* (2006.01)
(Continued)

(52) U.S. Cl.
CPC ............ *H04J 11/0056* (2013.01); *H04L 5/006* (2013.01); *H04L 5/0007* (2013.01);
(Continued)

(58) Field of Classification Search
CPC ....................................................... H04W 52/08
USPC .................................................. 370/329–333
See application file for complete search history.

(56) References Cited

U.S. PATENT DOCUMENTS

2009/0290653 A1   11/2009  Yun et al.
2010/0080139 A1*   4/2010  Palanki et al. ................ 370/252
(Continued)

FOREIGN PATENT DOCUMENTS

KR   1020090073855   7/2009

OTHER PUBLICATIONS

PCT International Application No. PCT/KR2011/002984, Written Opinion of the International Searching Authority, dated Dec. 27, 2011, 8 pages.
Fujitsu, "Subframe Configuration for Supporting High Order DL MIMO", 3GPP TSG-RAN1 #57, R1-091953, May 2009.

*Primary Examiner* — Anh-Vu Ly
*Assistant Examiner* — Abdullahi Ahmed
(74) *Attorney, Agent, or Firm* — Lee, Hong, Degerman, Kang & Waimey (57) ABSTRACT

A method of transmitting signals by a first base station in a mobile communication system is disclosed. The present invention comprises transmitting subframe allocation information to a second base station, the subframe allocation information being related to allocating multiple types of subframes; and transmitting the signals on subframes according to the subframe allocation information, wherein the multiple types of subframes includes a first type subframe and a second type subframe, and wherein the transmission of the signals is not limited on the first type subframe, and the transmission of the signals is limited on the second type subframe.

10 Claims, 7 Drawing Sheets

(51) Int. Cl.
  *H04W 72/04* (2009.01)
  *H04W 72/08* (2009.01)
  *H04W 84/04* (2009.01)
(52) U.S. Cl.
  CPC ............ *H04L5/0062* (2013.01); *H04L 5/0073* (2013.01); *H04L 5/0078* (2013.01); *H04L 5/0091* (2013.01); *H04W 72/0426* (2013.01); *H04W 72/082* (2013.01); *H04W 84/045* (2013.01)

(56) References Cited

U.S. PATENT DOCUMENTS

| | | | |
|---|---|---|---|
| 2011/0116437 A1* | 5/2011 | Chen et al. | 370/312 |
| 2011/0235582 A1* | 9/2011 | Chen et al. | 370/328 |
| 2011/0249642 A1* | 10/2011 | Song et al. | 370/329 |
| 2014/0293820 A1* | 10/2014 | Kim et al. | 370/252 |
| 2014/0307669 A1* | 10/2014 | Yang et al. | 370/329 |

* cited by examiner

1: first type subframe
2: second type subframe

METHOD OF TRANSMITTING AND RECEIVING SIGNALS IN A MOBILE COMMUNICATION SYSTEM USING A RADIO FRAME INCLUDING MULTIPLE TYPES OF SUBFRAMES AND APPARATUS THEREOF

CROSS-REFERENCE TO RELATED APPLICATIONS

This application is the National Stage filing under 35 U.S.C. 371 of International Application No. PCT/KR2011/002984, filed on Apr. 25, 2011, which claims the benefit of U.S. Provisional Application Ser. No. 61/329,061, filed on Apr. 28, 2010, the contents of which are all hereby incorporated by reference herein in their entirety.

TECHNICAL FIELD

The present invention relates to a mobile communication system, and more particularly, to a method of transmitting and receiving signals in a mobile communication system using a radio frame including multiple types of subframes and an apparatus thereof.

BACKGROUND ART

Generally, a mobile communication system is developing to diversely cover a wide range to provide such a communication service as an audio communication service, a data communication service and the like. In general, the mobile communication is a sort of a multiple access system capable of supporting communications with multiple users by sharing available system resources (e.g., bandwidth, transmission power, etc.). For examples of the multiple access system, there are CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like.

DISCLOSURE OF INVENTION

Technical Problem

An object of the present invention is to provide a method of transmitting and receiving signals in a mobile communication system using a radio frame including multiple types of subframes and an apparatus thereof, and more particularly, a method of transmitting and receiving signals in a radio frame including multiple types of subframes discriminated according to transmission activity and an apparatus thereof.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Solution to Problem

Accordingly, the present invention is directed to a mobile communication system that substantially obviates one or more of the problems due to limitations and disadvantages of the related art.

To achieve these objects and other advantages and in accordance with the purpose of the invention, as embodied and broadly described herein, a method of transmitting signals by a first base station in a mobile communication system, comprises transmitting subframe allocation information to a second base station, the subframe allocation information being related to allocating multiple types of subframes; and transmitting the signals on subframes according to the subframe allocation information, wherein the multiple types of subframes includes a first type subframe and a second type subframe, and wherein the transmission of the signals is not limited on the first type subframe, and the transmission of the signals is limited on the second type subframe.

Also, the method comprises receiving subframe allocation information from the second base station.

Also, the received subframe allocation information is temporary subframe allocation information.

Also, the method comprises adjusting a number of the first type subframe or a position of the first type subframe in the received temporary subframe information, and wherein the transmitting subframe information is the adjusted temporary subframe information.

Also, the method comprises transmitting a message requesting the temporary subframe allocation information, the temporary subframe allocation information being related to allocating the multiple types of subframes temporarily.

Also, the multiple types of subframes are classified by a transmission activity

Also, the multiple types of subframes are classified by a power level.

In another aspect of the present invention, an apparatus for transmitting signals in a mobile communication system, the apparatus comprises a transmitting module configured to transmit the signals; and a processor configured to control the transmitting module to transmit subframe allocation information to a second base station, the subframe allocation information being related to allocating multiple types of subframes; and configured to control the transmitting module to transmit the signals on subframes according to the subframe allocation information, wherein the multiple types of subframes includes a first type subframe and a second type subframe, and wherein the transmission of the signals is not limited on the first type subframe, and the transmission of the signals is limited on the second type subframe.

Also, the apparatus comprises a receiving module configured to receive signals, and wherein the processor is configured to control the receiving module to receive subframe allocation information from the second base station.

Also, the received subframe allocation information is temporary subframe allocation information.

Also, the processor is configured to control adjusting a number of the first type subframe or a position of the first type subframe in the received temporary subframe allocation information, and the transmitted subframe allocation information is the adjusted temporary subframe information.

Also, the processor is configured to control the transmitting module to transmit a message requesting the temporary subframe allocation information, the temporary subframe allocation information being related to allocating the multiple types of subframes temporarily.

Also, the multiple types of subframes are classified by a transmission activity.

Also, the multiple types of subframes are classified by a power level.

It is to be understood that both the foregoing general description and the following detailed description are exemplary and explanatory and are intended to provide further explanation of the invention as claimed.

Advantageous Effects of Invention

In accordance with embodiments of the present invention, limited radio sources can be used efficiently by minimizing interference or noise occasionally generated between cells adjacent to each other, and stability of signal transmission and reception is secured.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts. For instance, although the following description is made on the assumption of 3GPP LTE based system for example of a mobile communication system, it is applicable to various kinds of mobile communication systems such as IEEE 802.16 based systems and the like.

For example of a mobile communication system according to the present invention, 3GPP LTE system is described as follows.

Figure 1:
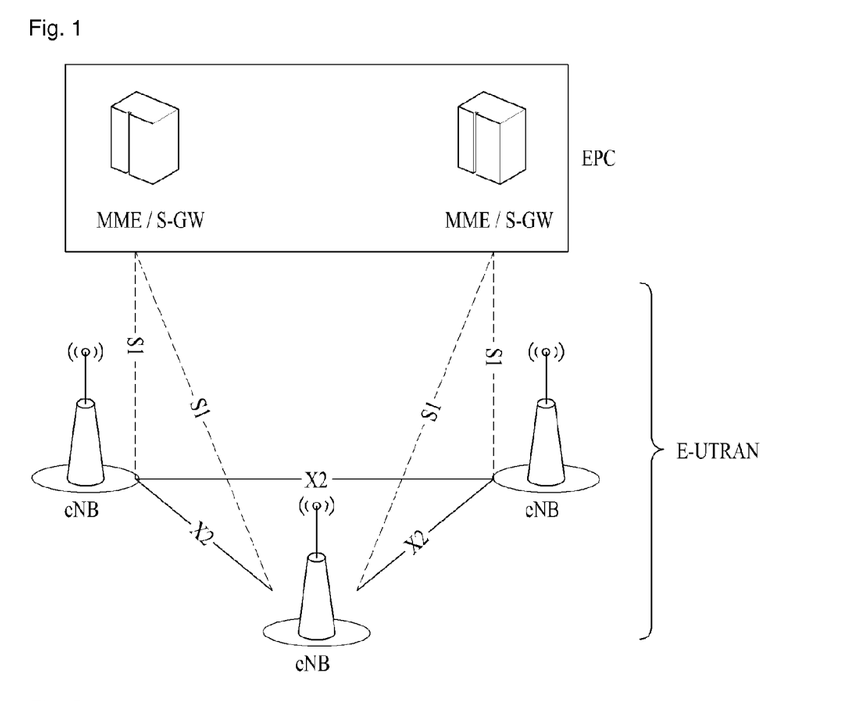
FIG. 1 is a diagram for a structure of E-UMTS (evolved universal mobile telecommunication system) according to the present invention.

FIG. 1 is a diagram for a structure of E-UMTS (evolved universal mobile telecommunication system) according to the present invention.

Referring to FIG. 1, E-UMTS (evolved universal mobile telecommunications system) is the system evolved from the conventional UMTS (universal mobile telecommunications system) and is currently standardized by 3GPP. Generally, E-UMTS can be called LTE (long term evolution) system. The E-UMTS system can be divided into E-UTRAN (evolved terrestrial radio access network) and EPC (evolved packet core).

The E-UTRAN can include a base station or an evolved NodeB (hereinafter abbreviated eNB) and an user equipment (hereinafter abbreviated UE). The eNBs are connected to each other by wire over X2 interface. And, the eNB and the UE are connected to each other by wireless over Uu interface.

The EPC can include a mobility management entity (hereinafter abbreviated MME) responsible for a function of a control plane, a serving gateway (hereinafter abbreviated S-GW) responsible for a function of a user plane, and a packet data network gateway (hereinafter abbreviated PDN-GW) responsible for a function of a user plane. The MME has access information of the UE or information on capability of the UE. Such information is mainly used for the mobility management of the UE. The S-GW is a gateway having the E-UTRAN as a terminal end point. And, the PDN-GW is a gateway having the PDN as a terminal end point.

A control message exchanged between the eNBs over the X2 interface uses X2AP (X2 application part) protocol and is called X2AP message. Another control message exchanged between the MME and the eNB over the S1 interface uses S1AP (S1 application part) protocol and is called S1AP message.

The Uu interface uses a radio interface protocol. In this case, the radio interface protocol can be divided into a first layer L1 including physical layers, a second layer L2 including MAC layer, RLC layer and PDCP layer, and a third layer L3 including RRC layers based on three lower layers of OSI (open system interconnection) reference model widely known in communication systems.

Figure 2:
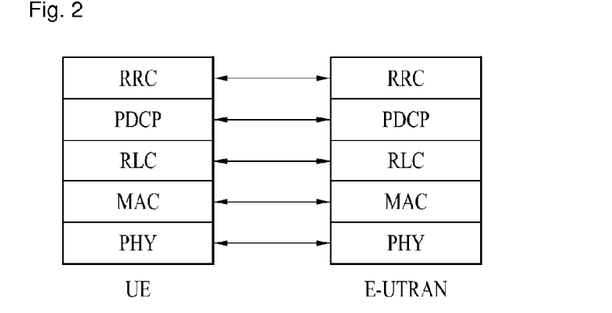
FIG. 2 and FIG. 3 are diagrams for structures of radio interface protocols between UE and E-UTRAN by 3GPP radio access network specifications according to the present invention.
Figure 3:
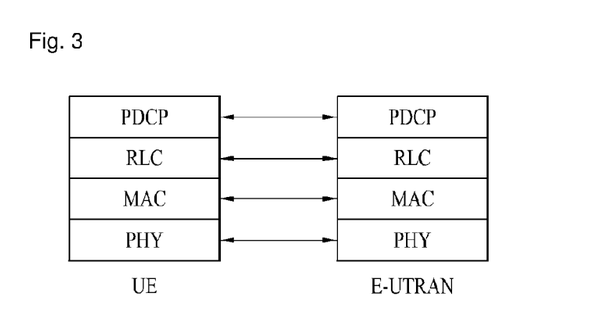

FIG. 2 and FIG. 3 are diagrams for structures of radio interface protocols between UE and E-UTRAN by 3GPP radio access network specifications according to the present invention.

Referring to FIG. 2 and FIG. 3, a radio interface protocol is horizontally constructed with a physical layer, a data link layer and a network layer. And, the radio interface protocol can be vertically divided into a user plane (hereinafter abbreviated U-plane) for a data information transfer and a control plane (hereinafter abbreviated C-plane) for a delivery of a control signal. The protocol layers shown in FIG. 2 or FIG. 3 can be divided into a first layer L1, a second layer L2 and a third layer L3 based on three lower layers of OSI (open system interconnection) reference model widely known in communication systems. The radio protocol layers exist as pairs in UE and E-UTRAN and are responsible for the data transfer in a radio section. In the following description, the layers of the radio protocol control plane shown in FIG. 2 and the layers of the radio protocol user plane shown in FIG. 3 are explained.

First of all, a physical layer of the first layer provides an information transfer service to an upper layer using a physical channel. The physical layer is connected to a medium access control (MAC) layer above the physical layer through a transport channel. And, data is transferred between the medium access control layer and the physical layer through the transport channel. Data is transferred between different physical layers, and more particularly, between a physical layer of a transmitting side and a physical layer of a receiving side. The physical layer is modulated by OFDM (orthogonal frequency division multiplexing) scheme and utilizes time and frequency as radio resources.

A medium access control (hereinafter abbreviated MAC) of the second layer provides a service to a radio link control layer, which is an upper layer, through a logical channel. The radio link control layer (hereinafter abbreviated RLC) of the second layer supports a reliable data transport. And, a function of the RLC layer can be implemented with a function block within the MAC layer. A PDCP layer of the second layer performs a header compression function for reducing an IP packet header size, which is relatively big and carries unnecessary control information, to efficiently transmit such an IP packet as IPv4, IPv6 and the like in a radio section having a narrow bandwidth.

A radio resource control (hereinafter abbreviated RRC) layer situated at the top of the third layer is defined in a control plane only. The RRC layer is responsible for controlling logical channels, transport channels and physical channels in association with configuration, reconfiguration and release of radio bearers (hereinafter abbreviated RBs). In this case, the RB means a service provided by the second layer for the data delivery between the UE and the E-UTRAN. In case that an RRC connection is established between the RRC layer of the UE and the RRC layer of the E-UTRAN, the UE is in an RRC connected state (RRC_CONNECTED). Otherwise, the UE is in an RRC idle state (RRC_IDLE). The RRC state of the UE and the RRC connecting method are further described as follows. First of all, the RRC state means whether the RRC of the UE is logically connected to the RRC of the E-UTRAN. If the RRCs are logically connected together, such a state can be named 'RRC_CONNECTED state'. Otherwise, such a state can be named 'RRC_IDLE state'. Since the UE in the RRC_CONNECTED state has the RRC connection, the E-UTRAN is able to recognize an existence of the corresponding UE by cell unit and is able to effectively control the corresponding UE. On the other hand, the E-UTRAN is unable to recognize the UE in the RRC_IDLE state. And, the EPC manages the UE in the RRC_IDLE state by tracking area unit that is a unit of area larger than a cell. In particular, a presence or non-presence of the UE in the RRC_IDLE state can be recognized by a larger area unit only. Therefore, in order to receive such a general mobile communication service as a voice service, a data service and the like, the corresponding UE should enter the RRC_CONNECTED state. When a user initially turns on a power of a UE, the UE searches for an appropriate cell and then stays in RRC_IDLE state in the found cell. If the UE staying in the RRC_IDLE state needs to establish an RRC connection, the UE establishes the RRC connection with an RRC of E-UTRAN and then make a transition to RRC_CONNECTED state. For instance, if the UE in the idle state needs to establish the RRC connection, it means a case that an uplink data transmission is required due to such a reason as a user' call attempt and the like, a case that a message is sent in response to a reception of a paging message from the E-UTRAN, and the like. Meanwhile, downlink channels for transmitting data from eNB to UE include a broadcast channel (hereinafter abbreviated BCH) for carrying system information, a downlink shared channel (DL SCH) for carrying an user traffic or a control message, and the like. A traffic or control message of a downlink multicast or a broadcast service can be carried on the DL SCH or a separate DL MCH (downlink multicast channel). Meanwhile, uplink channels for transmitting data from UE to eNB include a random access channel (hereinafter abbreviated RACH) for carrying an initial control message, a UL SCH (uplink shared channel) for transmitting an user traffic or a control message. Logical channels, which are situated above transport channels and mapped to the transport channels, include BCCH (Broadcast Channel), PCCH (Paging Control Channel), CCCH (Common Control Channel), MCCH (Multicast Control Channel), MTCH (Multicast Traffic Channel) and the like.

Figure 4:
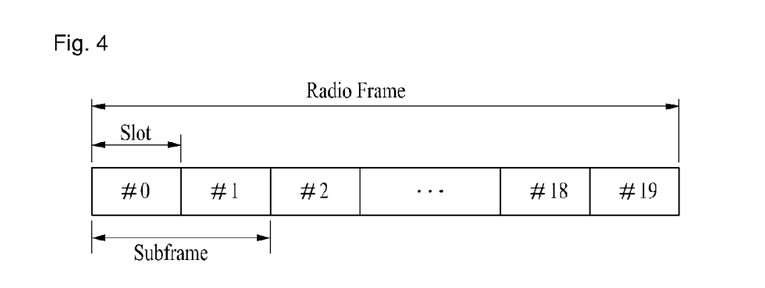
FIG. 4 is a diagram for a structure of a radio frame according to the present invention.

FIG. 4 is a diagram for a structure of a radio frame according to the present invention.

Referring to FIG. 4, a radio frame is consisted of 10 subframes. Each of the subframes is consisted of 2 slots. And, a time taken to transmit a subframe is defined as a transmission time interval (hereinafter abbreviated TTI). For instance, one subframe can have a length of 1 ms and one slot can have a length of 0.5 ms. Optionally, the number of subframes included in a radio frame, the number of slots included in the subframe, and the number of OFDM symbols included in the slot can be diversely modified.

Figure 5:
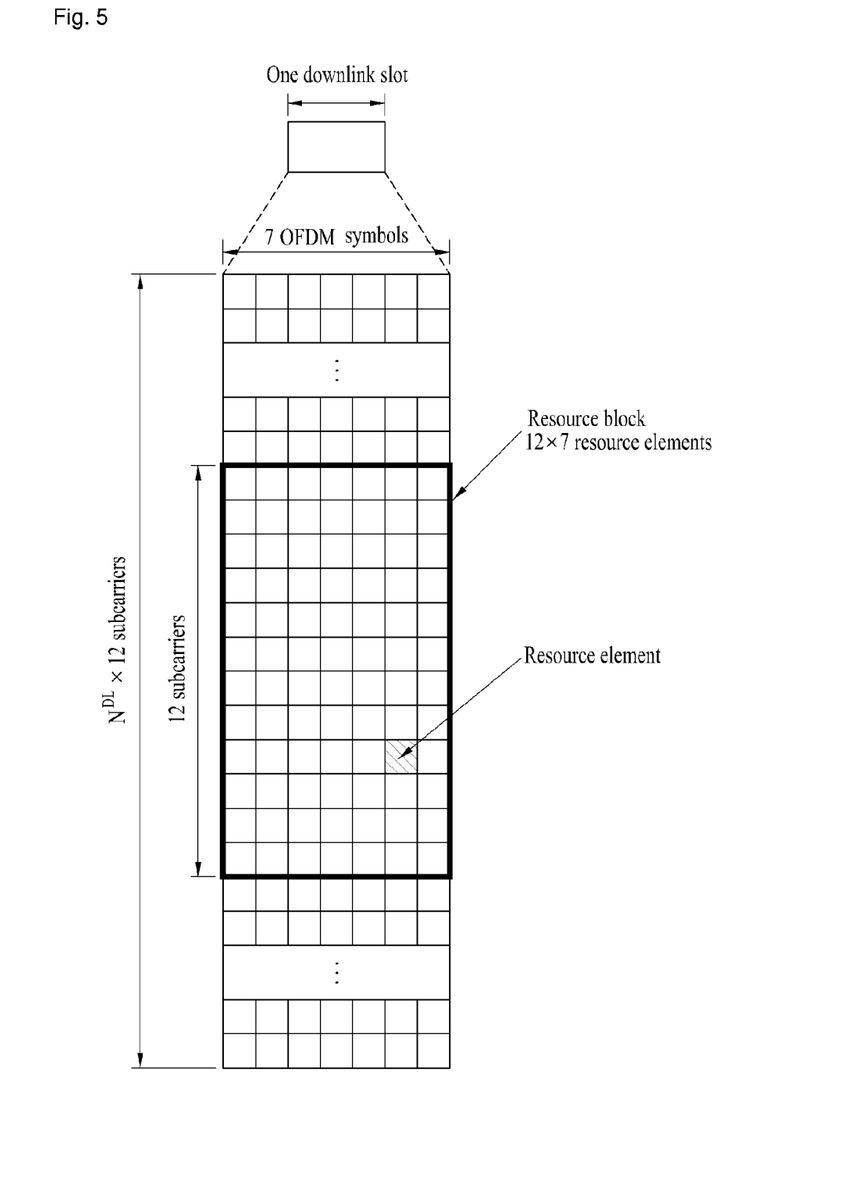
FIG. 5 is a diagram for a resource grid of a downlink slot according to the present invention.

FIG. 5 is a diagram for a resource grid of a downlink slot according to the present invention.

Referring to FIG. 5, a downlink slot includes a plurality of OFDM (orthogonal frequency division multiplexing) symbols in time domain. In particular, the downlink slot includes 7 OFDM symbols, and a resource block (hereinafter abbreviated RB) is able to include 12 subcarriers in frequency domain. Each element on a resource grid is called a resource element (hereinafter abbreviated RE). One RB is able to include 12×7 REs. The number of RBs included in a downlink slot depends on a downlink transmission bandwidth set up in a corresponding cell.

Figure 6:
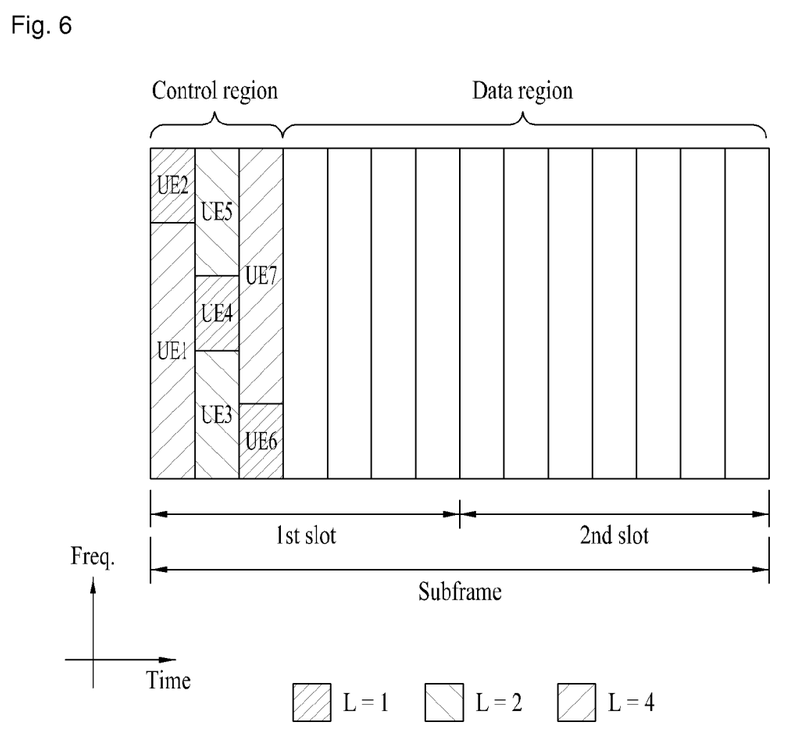
FIG. 6 is a diagram for a structure of a downlink subframe according to the present invention.

FIG. 6 is a diagram for a structure of a downlink subframe according to the present invention.

Referring to FIG. 6, a downlink subframe includes 2 contiguous slots. Maximum 3 fore OFDM symbols of a first slot in a subframe correspond to a control region to which PDCCH (physical downlink control channel) is allocated. And, the rest OFDM symbols in the subframe become a data region to which a PDSCH (physical downlink shared channel) is allocated. Moreover, such a control channel as PCFICH, PHICH and the like can be allocated to the control region. An UE is able to receive data information through a PDSCH indicated by control information carried on PDCCH. The control region includes a control channel element (CCE) aggregation corresponding to a plurality of control channel elements (CCEs). In this case, the control channel element (CCE) corresponds to a plurality of resource element groups. A plurality of PDCCHs can be transmitted within the control region to a plurality of UEs. The PDCCH is transmitted via the aggregation of at least one CCE. In this case, the number of CCEs used for the PDCCH transmission is named as an aggregation level of CCE. For instance, the aggregation level can be set to one of 1, 2, 4 and 8. The aggregation level is the number of CCEs used for the PDCCH transmission and is a unit of CCE for searching the PDCCH. The aggregation level of CCE may vary per UE. Referring to FIG. 6, UE2 has an aggregation level set to 1, UE4 has an aggregation level set to 1, UE6 has an aggregation level set to 1, UE3 has an aggregation level set to 2, UE5 has an aggregation level set to 2, UE1 has an aggregation level set to 4, and UE7 has an aggregation level set to 4.

The aggregation level differs per UE, because MCS (modulation and coding scheme) level differs. The MCS level means a coding rate and a modulation order used for data coding. For instance, if the modulation order is 2, BPSK (binary phase shift keying) is used. If the modulation order is 4, QPSK (quadrature phase shift keying) is used. If the modulation order is 6, 16 QAM (quadrature amplitude modulation) is used. Meanwhile, a coding rate can be varied while a modulation order is fixed. For instance, while a modulation order is fixed to QPSK, when a coding rate (i.e., useful bit over total bit) is set to ⅔, ⅓, ⅙ or 1/12, if a PDCCH carrying control information having the coding rate of ⅔ has an aggregation level of CCE set to 1, a PDCCH carrying control information having the coding rate set to ⅓ has an aggregation level set to 2. A PDCCH carrying control information having the coding rate set to ⅙ has an aggregation level set to 4. And, a PDCCH carrying control information having the coding rate set to 1/12 has an aggregation level set to 8. The increment of the coding rate means the decrement of the repetition of the same data within CCE. If the repetition of the same data is incremented within the CCE, it is able to raise the transmission reliability of the corresponding message or signal. Yet, if the repetition of the same data is incremented, it may cause a waste in aspect of radio resource.

Meanwhile, a PDCCH configuring process is independently performed for each corresponding PDCCH. Since an eNB does not provide an UE with information indicating where a corresponding PDCCH is located in a control region of a subframe, the UE should perform a blind decoding on all CCEs within the control region at an available aggregation level in each subframe to receive a PDCCH transmitted to the UE itself.

Figure 7:
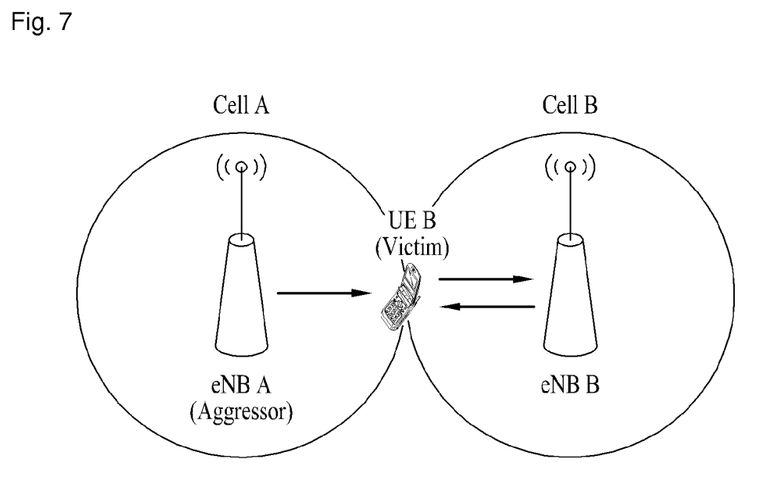
FIG. 7 is a diagram for one example of inter-cell interference according to the present invention.

FIG. 7 is a diagram for one example of inter-cell interference according to the present invention. In particular, UEs situated on a cell boundary are affected by signals in a neighboring cell. In viewpoint of UEs, those signals can cause interference or noise.

Referring to FIG. 7, a UE B is situated on a boundary between a cell B and a cell A. In viewpoint of the UE B, the cell A is a neighboring cell, while the cell B is a serving cell. Since the UE B on the boundary of the cell B is affected by a signal transmitted by an eNB A, the UE B can be named a victim and the eNB A can be named an aggressor as giving influence on the UE B. Meanwhile, although FIG. 7 shows inter-cell interference working on the UE situated on the cell boundary, it is also applicable to the interference between such cells overlapped with each other (e.g., interference between a macro cell and a femto cell, interference between a macro cell and a pico cell, etc.).

Figure 8:
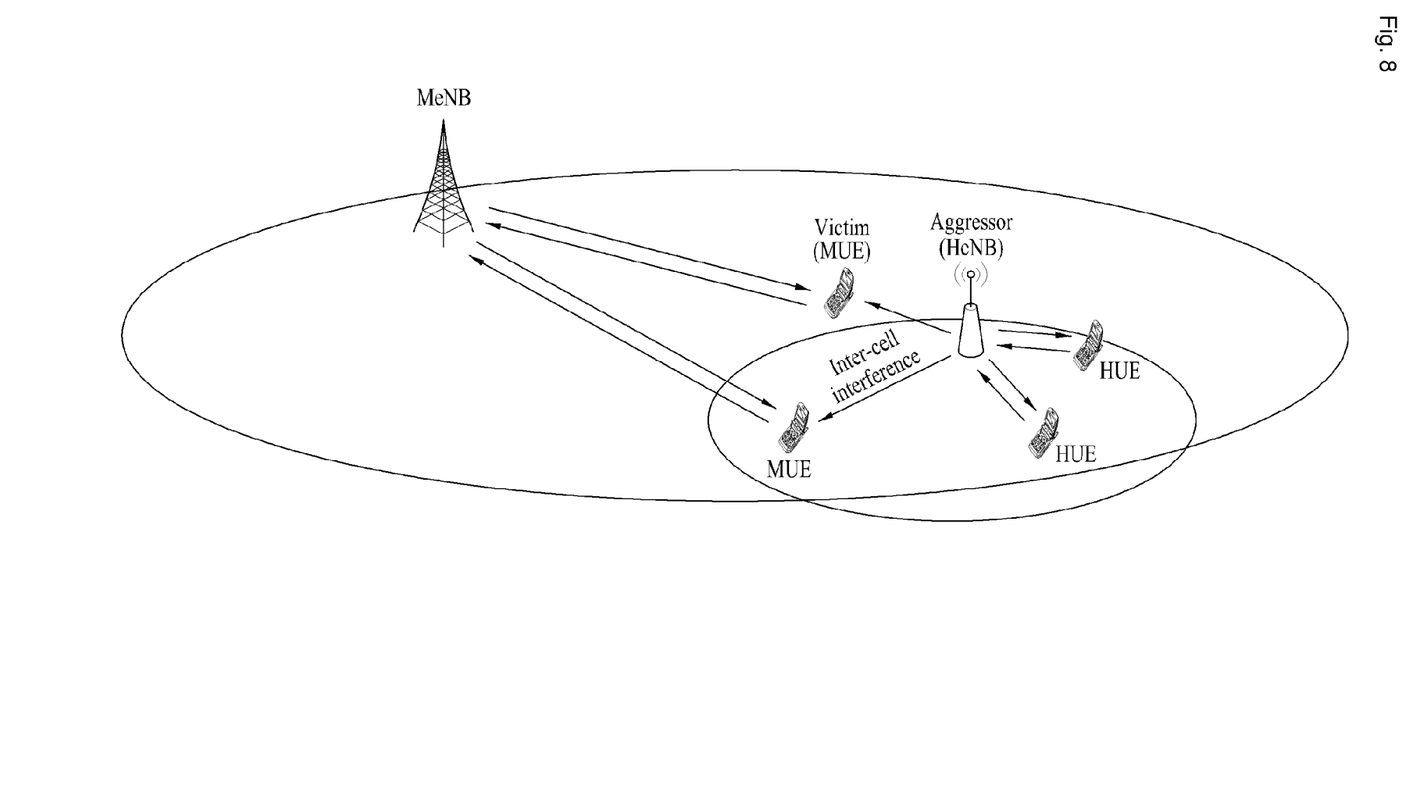
FIG. 8 is a diagram for another example of inter-cell interference according to the present invention.

FIG. 8 is a diagram for another example of inter-cell interference according to the present invention.

Referring to FIG. 8, in a CSG (closed subscriber group) cell including HeNB and HUE and a macro cell including MeNB and Macro UE (hereinafter abbreviated MUE), the MUE plays a role as a victim and the HeNB plays a role as an aggressor. The MeNB means an eNB of a macro cell to which all UEs are accessible. And, the HeNB means an eNB of the CSG cell that grants an access to a specific UE only.

The object of the HeNB is to provide a specialized service to a member belonging to a CSG (closed subscriber group) only. If such an object is excluded, the HeNB has the almost same functions of a normal eNB. In general, since a radio transmission output of the HeNB is smaller than that of a normal eNB of a mobile communication network service provider, a service area of the HeNB is smaller than the normal eNB. Due to such property, in aspect of the service area, a cell provided by the HeNB can be classified into a femto cell or a pico cell in comparison with a macro cell provided by the normal eNB.

Meanwhile, referring to FIG. 8, although the MUE (victim) is located within a service area of the HeNB (aggressor), since the access to the corresponding HeNB (aggressor) is restricted, the MUE (victim) should perform transmissions and receptions of signals with a remote MeNB. And, the MUE (victim) receives very strong interference or noise in a downlink from the HeNB (aggressor). Besides, there can exist a MUE (victim) receiving interference or noise from a HeNB (aggressor), remote from the MeNB despite being located outside the service area of the HeNB (aggressor). Therefore, the demand for a method of securing operations of the MUEs (victims) is rising.

Figure 9:
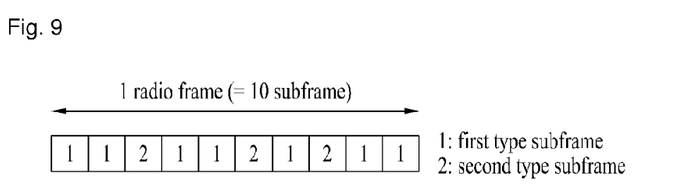
FIG. 9 is a diagram for a structure of a radio frame transmitted from an aggressor according to the present invention.

FIG. 9 is a diagram for a structure of a radio frame transmitted from an aggressor according to the present invention.

Referring to FIG. 9, a radio frame can be divided in to multiple types of subframes. The multiple types of subframes can include a first type subframe and a second type subframe. In this case, the first type subframe and the second type subframe can be discriminated from each other based on transmission activity. The first type subframe can correspond to an interval that the transmission activity has a normal level, while the second type subframe can correspond to an interval that the transmission activity has a low level. For instance, the interval having the normal level corresponds to an interval in which transmissions of all signals are possible, while the interval having the low level corresponds to an interval in which transmissions of signals are restricted in part. For instance, a transmission of some control signals (e.g., reference signal (RS), synchronized channel (SCH), broadcast channel (BCH, etc.) is possible on the interval having the low level but transmissions of the rest (e.g., data signal) are restricted. Using a subframe on which transmission activity has a low level, it is able to reduce interference or noise caused to MUEs (victims) by the aggressor.

Elements for configuring the transmission activity can include a power. A radio frame can be divided into multiple types of subframes in accordance with a power level. For instance, signals can be transmitted on the first type subframe with a power of a normal level, and signals can be transmitted on the second type subframe with a power of a low level.

Also, the elements for configuring the transmission activity can include an average power. For instance, on the first type subframe, an average power in a corresponding subframe may be maintained to a normal level, and, on the second type subframe, an average power in a corresponding subframe may be maintained to a low level.

The number and position of the first or second type subframes in the radio frame can be determined in accordance with the number of victims affected by the aggressor or a size of the interference on the victim. Patterns of the first and second type subframes can be repeated in a period of a radio frame. And, the patterns of the first and second type subframes can be repeated by unit of a plurality of radio frames. And, it is apparent that a pattern of a subframe type can be changed each radio frame. Subframe allocation information on a subframe pattern can be defined using a bitmap or index.

Meanwhile, although FIG. 9 shows that a radio frame is divided by subframe unit based on transmission activity, it is apparent that a radio frame can be divided by slot unit as well. And, it is also apparent that subframe allocation information can be received from an aggressor.

Figure 10:
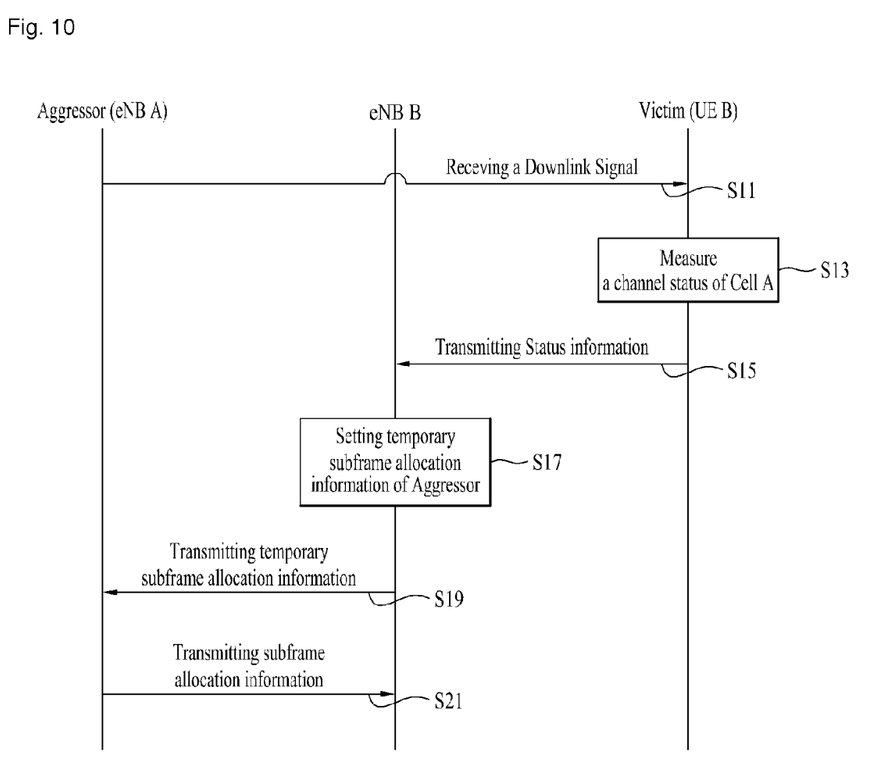
FIG. 10 is a diagram for a process of setting and transmitting subframe allocation information according to the present invention.

FIG. 10 is a diagram for a process of setting and transmitting subframe allocation information according to the present invention.

Referring to FIG. 10, a victim (UE B) is able to receive a downlink signal from an aggressor (eNB A) (S11). In this case, the downlink signal can include a pilot signal. Based on the received downlink signal, the victim (UE B) is able to continuously measure a channel status of a cell A (S13). And, the victim (UE B) is able to transmit status information (e.g., reference signal received power (RSRP), channel quality information (CQI), etc.) on the channel status of the cell A to an eNB B (S15). The eNB B is able to check an influence (e.g., interference or noise, etc.) of the victim (UE B), which is caused by the aggressor (eNB A). If a value based on the status information received from the UE B exceeds a predetermined threshold, it is able to set temporary subframe allocation information for the aggressor (eNB A) (S17). The temporary subframe allocation information can include information temporary allocating multiple types of subframes in a radio frame. The multiple types of subframes can be identified based on transmission activity. And, the multiple types of subframes can include a first type subframe and a second type subframe. The first type subframe type can correspond to an interval that the transmission activity has a normal level, while the second type subframe can correspond to an interval that the transmission activity has a low level. For instance, the interval having the normal level corresponds to an interval in which transmissions of all signals are possible, while the interval having the low level corresponds to an interval in which transmissions of signals are restricted in part. For instance, a transmission of some control signals (e.g., reference signal (RS), synchronized channel (SCH), broadcast channel (BCH, etc.) is possible in the interval having the low level but transmissions of the rest (e.g., data signal) are restricted. Moreover, elements of the transmission activity can include a power or an average power.

The eNB B is able to determine the number of the first or second type subframes within the radio frame based on the channel status information received from the victim (UE B) and is also able to determine a position of the first or second type subframes. The eNB B is able to transmit the set temporary subframe allocation information to the aggressor (eNB A) (S19).

The aggressor (eNB A) is able to transmit the subframe allocation information, which is confirmed based on the received temporary subframe allocation information, to the eNB B (S21). For the received temporary subframe allocation information, the aggressor (eNB A) may adjust the number of the first or second type subframes or may adjust a position of the first or second type subframes. The aggressor (eNB A) is then able to transmit the adjusted subframe allocation information to the eNB B.

Moreover, the aggressor (eNB A) may send a confirm message for the received temporary subframe allocation information. The confirm message corresponds to a message for confirming some of the received temporary subframe allocation information or a message for confirming all of the received temporary subframe allocation information.

The aggressor (eNB A) is able to send a readjustment request message for the received temporary subframe allocation information. Having received the readjustment request message, the eNB B may adjust the temporary subframe allocation information and then may retransmit the adjusted temporary subframe allocation information. And, the eNB B can repeatedly perform the adjustment and the retransmission until receiving a confirm message from the aggressor (eNB A). The temporary subframe allocation information and the subframe allocation information can be transmitted as X2AP message over X2 interface.

Meanwhile, the aggressor (eNB A) is able to transmit a request message for requesting a transmission of temporary subframe allocation information to the eNB B.

Also, the eNB B is able to forward status information received from the victim (UE B) to the aggressor (eNB A) without setting temporary subframe allocation information. Based on the received status information on the victim (UE B), the aggressor (eNB A) sets subframe allocation information and is then able to sent the set subframe allocation information to the eNB B.

Figure 11:
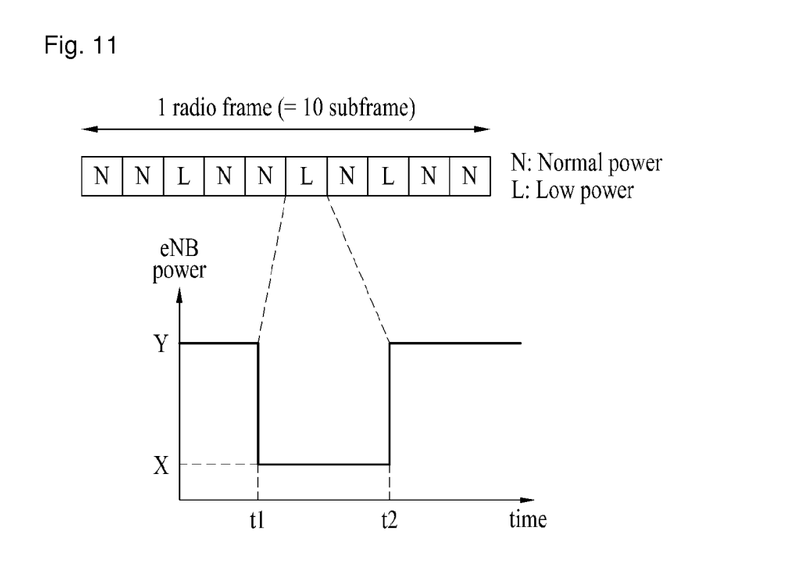
FIG. 11 is a diagram for a signal transmission structure on a corresponding subframe based on subframe allocation information according to the present invention.

FIG. 11 is a diagram for a signal transmission structure in a corresponding subframe based on subframe allocation information according to the present invention.

Referring to FIG. 11, a radio frame is divided based on transmission activity and elements of the transmission activity include a power or an average power, by which the present invention is non-limited.

For instance, a first type subframe corresponds to a normal power and a second type subframe is able to correspond to a low power. An aggressor is able to transmit signals on a subframe with a corresponding power level based on subframe allocation information. Referring to FIG. 11, the aggressor is able to transmit signals with a power having a size Y on a first type subframe, and is also able to transmit signals with a power having a size X on a second type subframe.

Based on subframe allocation information, the aggressor is able to transmit signals by maintaining an average power on a corresponding subframe in accordance with a subframe type. The aggressor is able to transmit signals to maintain the power of the size Y on the first type subframe and is also able to transmit signals to maintain the power of the size X on the second type subframe.

In doing so, since the aggressor should transmit the signal with the power of the size X on the second type subframe, a method of securing reliability of signal transmission in accordance with a reduced power is required. And, the aggressor requires a signal transmitting method for maintaining an average power of the size X on the second type subframe.

According to a first embodiment, a method of restricting a transmission of a prescribed signal on a second type subframe or a method of reducing a transmission power of a prescribed signal on a second type subframe is proposed. In particular, an aggressor is able to perform a transmission of some control signals (e.g., reference signal (RS), synchronized channel (SCH), broadcast channel (BCH, etc.) on a second type subframe having a low level. Yet, the aggressor restricts transmissions of the rest (e.g., data signal) or reduces a transmission power thereof. And, the aggressor transmits subframe allocation information to a UE belonging to its cell to control the UE not to perform downlink monitoring on the second type subframe. The aggressor is able to transmit information on a start time of the second type subframe and information on an end time thereof to the UE belonging to its cell. Since a transmission of a prescribed signal to an UE (victim) of a neighboring cell from the aggressor to a victim does not exist on the second type subframe or a transmission power of a prescribed signal is low on the second type subframe, it is able to minimize interference on the victim.

According to a second embodiment, a method of restricting a transmission of a reference signal on a second type subframe or a method of reducing a transmission power of a reference signal on the second type subframe is applicable. Configuration of the second embodiment is equal to that of the first embodiment except that a prescribed signal corresponds to a reference signal. For instance, the reference signal can correspond to a common reference signal (CRS). The CRS means a reference signal shared with all UEs in a cell in downlink and is distributed across all bands. The CRS is usable for the purpose of acquisition of channel status information and data demodulation. Meanwhile, if a transmission power of a reference signal including the CRS is changed, a changed value is transmitted to a UE to be reflected by channel estimation and measurement of the UE. Moreover, it is apparent that the second embodiment is applicable to a case that the aggressor reduces a whole signal transmission power.

According to a third embodiment, an aggressor may not transmit signals on a second type subframe using a discontinuity (DRX) command. A discontinuity reception (DRX) is related to an operation for deciding when an eNB will send a signal to a UE in the course of performing a communication between the eNB and the UE. The DRX can include 'on-duration' and 'opportunity for DRX'. The 'on-duration' interval corresponds to a wake-up interval or a monitoring interval. And, the 'opportunity for DRX' interval corresponds to a sleep interval or a non-monitoring interval. The aggressor may configure the intervals in a manner of enabling the 'on-duration' interval of the DRX to correspond to a first type subframe and enabling the 'opportunity for DRX' interval to correspond to a second type subframe. According to this DRX configuration, the aggressor transmits signals using PDCCH on the first type subframe but does not transmit signals on the second type subframe. A UE of an aggressor cell wakes up on the first type subframe according to the DRX command and then performs a monitoring of the PDCCH but sleeps on the second subframe not to monitor the PDCCH. This operation is repeated by the UE of the aggressor cell. Since signals transmitted to a UE of a neighboring cell (victim) by the aggressor do not exist on the second type subframe, it is able to minimize the interference on the victim.

According to a fourth embodiment, an aggressor is able to define an aggregation level for a control channel (e.g., physical downlink control channel (PDCCH)) on a second type subframe separately from an aggregation level on a first type subframe. In particular, in order to transmit a signal with a power having a size equal to or smaller than a size X, it is able to raise an aggregation level of CCE. By incrementing the repetition count of corresponding information by lowering a coding rate, it is able to raise a successful rate or stability of signal transmission in a low power. Information carried on PDCCH is not increased and extension of the aggregation level is possible through a rate matching. For instance, when a signal is transmitted on a second type subframe, an aggregation level can be set to a full channel bandwidth. If the aggregation level is set to the full channel bandwidth, it is not necessary to perform a blind decoding on all CCEs each possible aggregation level. Therefore, a UE of an aggressor cell reduces power consumption and a decoding time. In case that a plurality of UEs are present in the aggressor cell, it is able to transmit PDCCH in a manner of dividing a radio resource of a control channel on a second type subframe by the number of the corresponding UEs and then aggregating CCEs in the corresponding radio resource as many as possible. Besides, the fourth embodiment can be limited by a case that an aggressor is HeNB.

Meanwhile, the above-described embodiments can be implemented in a manner of forming a plurality of combinations. For instance, in a plurality of UEs are present, transmissions of prescribed signals are restricted on some of the UEs on a second subframe. And, an aggregation level is raised for the rest of the UEs. Therefore, a signal can be stably transmitted with a low power.

Figure 12:
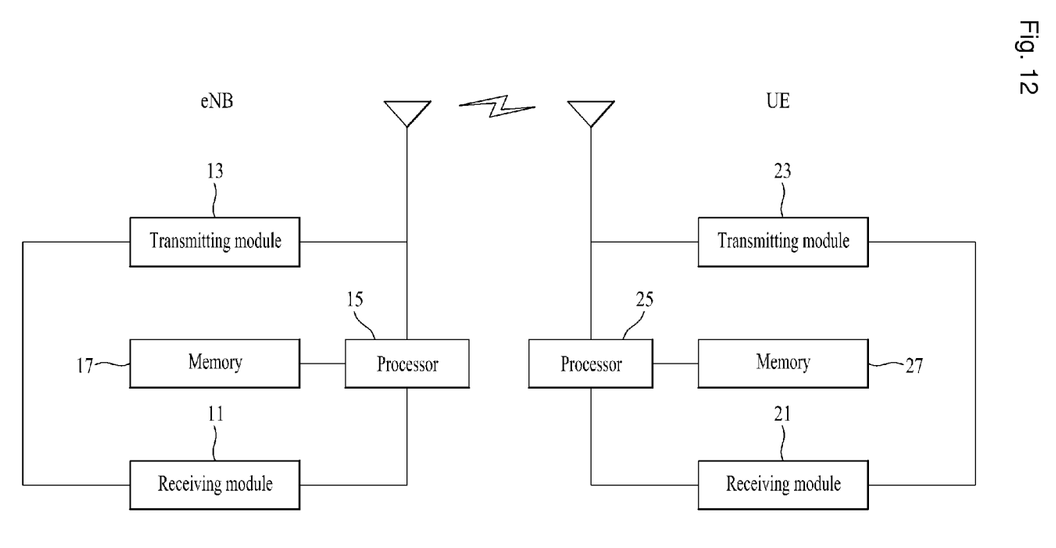
FIG. 12 is a block diagram for configurations of eNB and UE according to the present invention.

FIG. 12 is a block diagram for configurations of eNB and UE according to the present invention.

Referring to FIG. 12, an eNB includes a receiving module 11, a transmitting module 13, a processor 15 and a memory 17. The receiving module 11 is configured to receive various signals, data, information and the like from another eNB, a UE and the like. The transmitting module 13 is configured to transmit various signals, data, information and the like to another eNB, a UE and the like. The memory 17 is configured to temporarily store operation-processed information, various received signals, data and the like and can be substituted with such a component as a buffer (not shown in the drawing) and the like.

The processor 15 is configured to control the receiving module 11 to receive temporary subframe allocation information from an eNB of a neighboring cell. The temporary subframe allocation information can include allocation information on multiple types of subframes in a radio frame. The multiple types of subframes can be classified according to transmission activity, and includes a first type subframe and a second type subframe. For instance, the first type subframe corresponds to an interval that the transmission activity has a normal level, while the second type subframe corresponds to an interval that the transmission activity has a low level. The interval having the normal level corresponds to an interval available for transmissions of all signals. And, the interval having the low level corresponds to an interval that a transmission of prescribed signals is restricted. For instance, a transmission of some control signals (e.g., reference signal (RS), synchronized channel (SCH), broadcast channel (BCH, etc.) is possible in the interval having the low level but transmissions of the rest (e.g., data signal) are restricted. Preferably, elements of the transmission activity can include a power, an average power and the like.

The processor 15 is able to adjust the number of the first or second type subframes in the received subframe allocation information and is also able to adjust a position of the first or second type subframes. The processor 15 controls the transmitting module 13 to transmit the adjusted subframe allocation information to an eNB of a neighboring cell. The processor 15 controls the transmitting module 13 to transmit a confirm message for some or all of the received temporary subframe allocation information to the eNB of the neighboring cell. And, the processor 15 controls the transmitting module 13 to transmit a message for requesting temporary subframe allocation information to the eNB of the neighboring cell.

The processor 15 controls the transmitting module 13 to transmit signals to an UE on the first type subframe. The processor 15 controls the transmitting module 11 to restrict a transmission of some signals on the second subframe or is able to reduce a transmission power of some signals on the second subframe. The processor 15 controls the transmitting module 11 to restrict a transmission of a reference signal on the second subframe or is able to reduce a transmission power of a reference signal on the second subframe. The processor 15 is able to transmit a DRX command. The processor 15 configures the DRX in a manner of enabling 'on-duration' interval to correspond to a first type subframe and enabling 'opportunity for DRX' interval to correspond to a second type subframe. In accordance with this DRX configuration, the processor 15 controls the transmitting module 13 to transmit signals on the first type subframe and restricts a transmission of prescribed signals on the second type subframe. And, the processor 15 controls the transmitting module 11 to transmit signals on the second subframe by raising an aggregation level for a control channel.

An UE includes a receiving module 21, a transmitting module 23, a processor 25 and a memory 27. The receiving module 21 is configured to receive various signals, data, information and the like from the eNB. The transmitting module 23 is configured to transmit various signals, data, information and the like to the eNB. The memory 27 is configured to temporarily store operation-processed information, various received signals, data and the like and can be substituted with such a component as a buffer (not shown in the drawing) and the like.

The processor 25 controls the receiving module 21 to receive subframe allocation information from the eNB. The processor 25 controls the receiving module 21 to receive a DRX command. The processor 25 controls the receiving module 21 to receive an aggregation level extended signal. And, the processor 25 controls the receiving module 21 to stop a signal reception on the second type subframe.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As mentioned in the foregoing description, the embodiments of the present invention are described with reference to a case applied to 3GPP LTE based mobile communication system for clarity of the description. Moreover, the present invention is applicable to various mobile communication systems by the same method.

The invention claimed is:

1. A method of transmitting signals by a first base station in a mobile communication system, the method comprising:
   transmitting subframe allocation information to a second base station which is impacted by inter-cell interference from the first base station,
   wherein the subframe allocation information indicates a first type subframe transmitted by using normal power and a second type subframe transmitted by using lower power than the normal power; and
   transmitting, to a user equipment, the signals based on the subframe allocation information,
   wherein a CCE (control channel element) aggregation level of the second type subframe is configured higher than a CCE aggregation level of the first type subframe by incrementing a repetition count of control information corresponding to the second type subframe, and
   wherein the CCE aggregation level of the second type subframe is set to fill channel bandwidth of PDCCH (Physical Downlink Control Channel).

2. The method of claim 1, further comprising:
   receiving temporary subframe allocation information from the second base station.

3. The method of claim 2, further comprising:
   adjusting a number of the second type subframe or a position of the second type subframe.

4. The method of claim 2, further comprising:
   transmitting a message requesting the temporary subframe allocation information.

5. An apparatus for transmitting signals in a mobile communication system, the apparatus comprising:
   a transmitting module configured to transmit the signals; and
   a processor configured to:
      transmit subframe allocation information to a second base station which is impacted by inter-cell interference from the first base station,
      wherein the subframe allocation information indicates a first type subframe transmitted by using normal power and a second type subframe transmitted by using lower power than the normal power;
      transmit, to a user equipment, the signals based on the subframe allocation information,
      wherein a CCE (control channel element) aggregation level of the second type subframe is configured higher than a CCE aggregation level of the first type subframe by incrementing a repetition count of control information corresponding to the second type subframe, and
      wherein the CCE aggregation level of the second type subframe is set to fill channel bandwidth of PDCCH (Physical Downlink Control Channel).

6. The apparatus of claim 5, further comprising:
   a receiving module configured to receive signals, and
   wherein the processor is configured to control the receiving module to receive temporary subframe allocation information from the second base station.

7. The apparatus of claim 6, wherein the processor is configured to control adjusting a number of the second type subframe or a position of the second type subframe.

8. The apparatus of claim 6, wherein the processor is configured to control the transmitting module to transmit a message requesting the temporary subframe allocation information.

9. The method of claim 1, wherein the user equipment is connected to the first base station and located in an area that overlaps a cell area of the first base station and a cell area of the second base station.

10. The apparatus of claim 5, wherein the user equipment is connected to the first base station and located in an area overlapping a cell area of the first base station and a cell area of the second base station.

* * * * *